Jan. 7, 1941.      W. ROTH      2,228,088
HEAT TREATMENT FURNACE
Filed Dec. 22, 1938      2 Sheets-Sheet 1

WITNESSES:
Edward Michaels
Bernard L. Zangwill

INVENTOR
Willard Roth.
BY
O. B. Buchanan
ATTORNEY

Jan. 7, 1941.  W. ROTH  2,228,088

HEAT TREATMENT FURNACE

Filed Dec. 22, 1938  2 Sheets-Sheet 2

WITNESSES:
Edward Michaels
Bernard L. Zangwill

INVENTOR
Willard Roth.
BY O. B. Buchanan
ATTORNEY

Patented Jan. 7, 1941

2,228,088

UNITED STATES PATENT OFFICE 2,228,088

HEAT TREATMENT FURNACE

Willard Roth, Wilkinsburg, Pa., assignor to Westinghouse Electric & Manufacturing Company, East Pittsburgh, Pa., a corporation of Pennsylvania Application December 22, 1938, Serial No. 247,168

15 Claims. (Cl. 266—5)

My invention relates particularly to a heat treatment furnace especially adapted to bring a charge rapidly to a predetermined moderate temperature, or to maintain the charge thereat for an extended period of time with a minimum of variation from the desired temperature, or both; the charge when inserted into the furnace preferably being initially considerably above or considerably below the temperature at which it is to be heat treated, although the charge may also be initially at approximately that temperature.

In a preferred embodiment of my invention, the furnace comprises a treatment chamber in which the charge to be heat treated is placed and provision is made to circulate a gaseous atmosphere within the chamber and about the charge for two major purposes; first, rapid transfer of heat to and from the charge as the case may be, in order that the charge be brought to the desired temperature in as short a time as possible, and secondly, for maintaining an even temperature distribution throughout the chamber.

These two primary functions of the circulating atmosphere combine to bring about the results desired, and in a specific application, I have been able to change the temperature of a charge comprising suspended metallic plates from an initial temperature of approximately 1000° C. when inserted into the heat treatment chamber to approximately 550° C. within about 3 minutes, the charge being maintained at the latter temperature thereafter with maximum variations therefrom of only approximately 8°, although for by far the major portion of the time the temperature was substantially at the value desired. I desire it to be distinctly understood, however, that I do not quote these figures as limitations upon the operation of the furnace, but only as an example of a step in a heat treatment process carried out on a commercial scale in an eminently satisfactory manner for the process involved by a high-production electric furnace embodying the principles of my invention.

The furnace is preferably constructed to provide smooth paths of flow for the circulating atmosphere, the paths being created by means involving panels or baffles judiciously placed within the heating chamber to form passages for the flow of the atmosphere in the different directions without interference and without undue turbulence. Moreover, by means of energy transfer means in the nature of a heating means and a cooling means, the temperature of the circulating atmosphere may be controlled by the addition of heat when its temperature is below, and the subtraction of heat when its temperature is above, that point at which the charge is to be held.

In the specific construction disclosed, this transfer of heat is controlled automatically by a temperature-responsive means operating in conjunction with a valve means to direct the atmosphere through the paths in which it will be cooled or through the paths in which it will be heated, depending on the temperature of the heat treatment chamber. The paths themselves comprise a common central passage in which the charge is placed and the heating means disposed, and two branch passages, one of which is formed between a liquid-cooled jacket, which may comprise a wall of the furnace, and an insulating baffle, and the other between the insulating baffle and a second baffle. The valve means directs the atmosphere through one or the other of the branch passages, and when through the passage formed in part by the liquid-cooled jacket, the heating means can be shut off.

The furnace of this disclosure is especially constructed for the heat treatment of a charge comprising a plurality of articles coated in one way or another, which coatings at the temperature of the heat treatment are rather delicate and might be marred or injured by any contact between the articles. It is, therefore, imperative that the circulating atmosphere be directed about the articles in a manner that will least disturb them in order to insure a perfect product.

An example of a charge requiring care in its heat treatment would be a plurality of copper-oxide rectifier plates, each of which individually comprises a copper plate having a very thin copper-oxide layer on one or more of its surfaces and is relatively small, but a large number of plates is heat treated in batches in order to minimize the costs of production. With such a particular charge, the flow of atmosphere should be even and laminar in a direction parallel to the plates so that the plates will not swing into contact with each other. By providing a central passage and two branch passages as before described, for the circulating atmosphere, my furnace is especially suitable for heat treating such plates or similar articles.

In general, a furnace embodying the principles of my invention may employ a circulating atmosphere of any desired and appropriate composition and may take the form of a protective atmosphere, or air, or a mixture of different gases, preheated, precooled, or otherwise treated, depending on the heat treatment process and reactions or lack of reactions which the charge is to undergo. For brevity and the sake of simplicity, the gaseous atmosphere is hereinafter referred to simply as air but such term is not to be deemed a limitation unless so required for a specific end.

From the preceding it is apparent that it is among the objects of my invention:

(a) To provide generally a furnace capable of bringing a charge to or maintaining it at a predetermined moderate temperature, or both, and specifically, a charge comprising copper-oxide rectifier plates;

(b) To circulate air within the furnace for the purposes of bringing the charge rapidly to the desired temperature and maintaining it thereat with a minimum of variation therefrom;

(c) To circulate the air when the charge comprises copper-oxide rectifier plates or the like, in a manner to least disturb the charge while at the same time conforming to the preceding objects.

Other objects and novel features of my furnace will be apparent from the following description, taken in conjunction with the drawings, in which like numerals designate like parts and in which.

Figure 1:
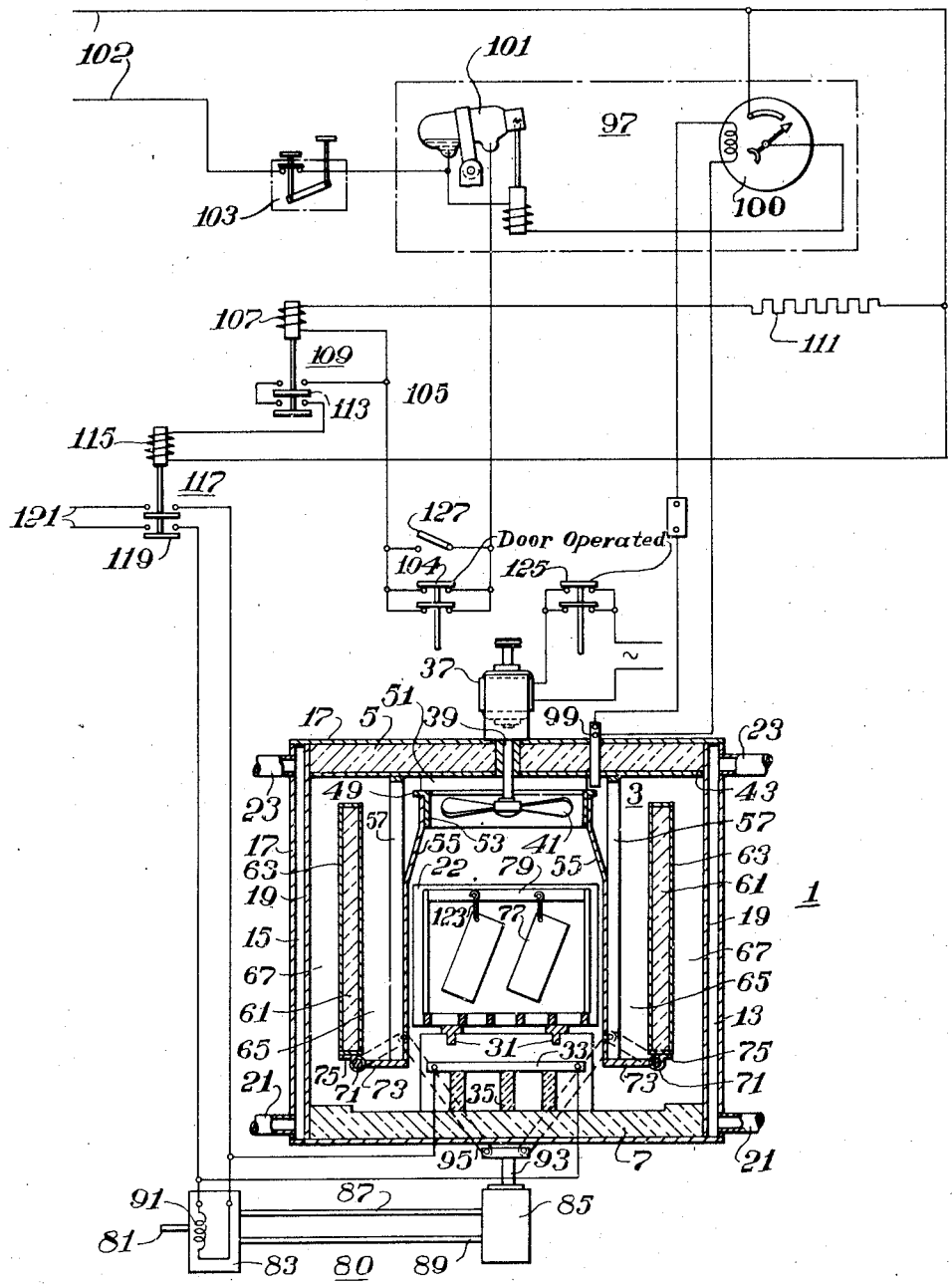
Figure 1 is a somewhat diagrammatic view in transverse, vertical section of a furnace embodying my invention, together with the control means therefor.
Figure 2:
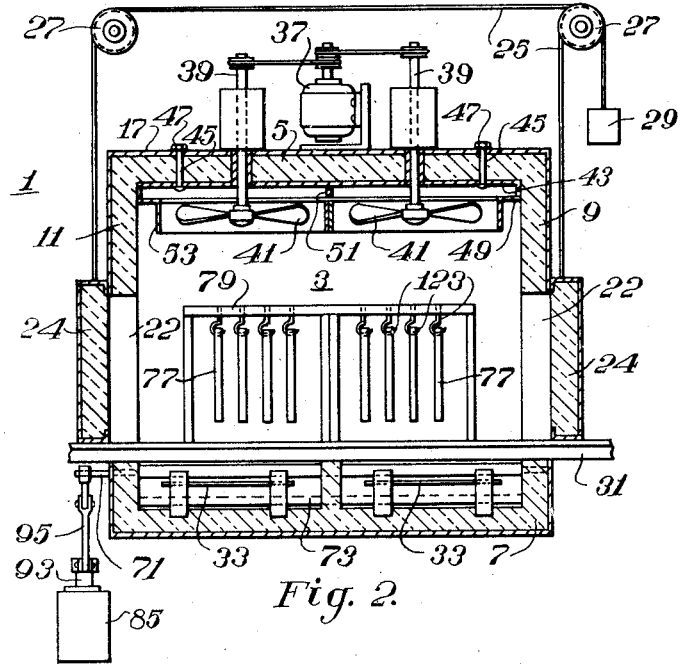
Fig. 2 is a view in longitudinal, vertical section through the furnace of Fig. 1.

Referring more particularly to Figs. 1 and 2, the furnace generally indicated by the reference numeral 1 comprises a heat treatment chamber 3 defined by a top wall 5, a bottom wall or base 7, two end walls 9 and 11, and two side walls 13 and 15, the walls being encased in an outer metallic shell 17 as is customary.

The walls of the furnace, except for the side walls 13 and 15, are constructed of fire brick in any conventional manner, the details of which form no part of my invention and, therefore, have been shown in the drawings only diagrammatically. However, the two side walls 13 and 15 comprise water-cooled jackets, one side of each being formed by an outer shell 17, and a cooperating spaced metallic member 19 forming the other side of the jacket, the ends of the jacket being sealed by the outside metallic shell 17 along the end walls 9 and 11 in any suitable manner. Inlet pipes 21 are disposed in the lower portion of each jacket and outlet pipes 23 in the upper portion, and are controlled by valves as shown. Water admitted to the inlet pipes 21 will flow upwardly through the side wall water jackets 13 and 15 and out through the outlet pipes 23. The side walls form the water jacket cooling means for the circulated air within the heat treatment chamber 3 since any air flowing in contact with the metal side 19 of the water jackets will be cooled. The manner in which the air is circulated in contact with these jackets will be described in detail subsequently.

The charge which is to be heat treated in the chamber 3 may be inserted and withdrawn therefrom through openings 22 in each of the end walls 9 and 11, the openings being closed by doors 24 moved to open and closed position by an appropriate mechanism indicated in this instance as comprising cables 25 riding over pulleys 27 and attached to a common counterweight 29.

To facilitate moving of the charge into and out of the furnace rails 31 are provided which are supported in any suitable manner somewhat above the base wall 7 and extend the full length of the furnace 1.

The supporting means for the rails 31 are of sufficient height to provide an open space below the rails in which heating units 33 are disposed upon insulating piers 35, and through which air being circulated may flow. The heating units in my preferred embodiment are electrical and comprise high resistance alloy straps or rods of a common form, although any other appropriate heating means may be employed as, for example, radiant tubes internally heated by burning gas.

A motor 37 secured to the top of the furnace drives two shafts 39 which extend through suitable gas-tight bearings in the top wall 5 into the interior of the furnace, and have secured at their ends propeller fan blades 41 for the purpose of circulating the air within the heating chamber.

In order to provide an efficient circulating system within the heat treatment chamber 3, a skeleton frame is secured to the top of the furnace and baffle means are provided adjacent the water-cooled walls thereof, whereby the air may circulate downwardly through the center of the heating chamber around the ends of the baffle means at the bottom of the furnace, upwardly through passages provided by the baffle means and then around the ends of the baffle means at the top of the furnace to the intake side of the propeller blades 41. This skeleton frame comprises a metallic top sheet 43 which I prefer to make of a size sufficient to cover the entire exposed interior surface of the top wall 5, and which is secured in position by means of bolts 45 extending through the wall 5 having nuts 47 at the outer ends for holding the plate 43 securely in place. A parallel metallic plate 49, which is of considerably less width than the furnace is maintained in spaced relation with respect to the top plate 43 by webs 51, positioned to extend in the direction of air flow. The plates 43 and 49 and the webs 51 may be welded together to provide a rigid unitary structure which comprises the skeleton frame. The top plate 43 has suitable apertures through which the shafts 39 of the fan may pass, and the bottom plate 49 has two enlarged circular openings somewhat larger than the diameter of the fan blades 41.

In order to provide a more efficient flow of air outwardly from the fan blades 41, metallic shrouds 53 fit the enlarged openings in the plate 49 and depend therefrom to surround the fan blades whereby to confine and direct the flow of the air. The shrouds 53 further form a supporting means for depending baffles 55 which are preferably also of sheet metal capable of withstanding the temperature to which they may be subjected within the furnace. The baffles 55 extend the full length of the heat treatment chamber 3 and are preferably welded or otherwise secured to the shrouds 53 at points along the transverse diameters thereof, and to further reinforce these baffles straps 57 may be welded or otherwise secured to the top plate 43 so as to extend downwardly therefrom, and may be fitted or secured to the lower part of the baffles 55 in any suitable manner. It may be observed that the height of the baffles 55, and their disposition are such as to provide open passages for the flow of air above and below the baffles.

Spaced between each of the baffles 55 and the adjacent side wall 13 or 15 is an additional baffle 61 also of a height and disposition to permit the flow of air above and below it. The baffles 61 are preferably of heat-insulating material and also extend the full length of the heat treatment chamber, being secured by appropriate means to the end walls. If desired, the baffles 61 may comprise a good grade fire brick encased in a heat-resistant metallic shell 63 for the purpose of retaining the configuration of the baffles.

It may be observed that by the provision of the two baffles 55 and 61 in spaced relation at each side of the furnace, any air flowing downwardly through the center of the heating chamber may return to the fan blades either by way of the passages 65 formed between the baffles 55 and 61 or by way of the passages 67 formed between the baffles 61 and the side walls. I prefer to direct the air through one or the other of the passages 65 and 67 depending on whether or not the air is to be cooled, and for this purpose a damper means is provided. The damper means comprises a rotatable rock shaft 71 below each of the baffles 61, extending the full length of the chamber 3, and also through one of the end walls to provide protruding stubs to which damper-operating mechanism may be attached. The shafts 71 have secured thereto for rotation therewith dampers or flap valves 73, which in the upper horizontal position close the passages 65 and open the passages 67 as shown more particularly in Fig. 1, while in the vertical position open the passages 65 and close the passages 67 as shown more particularly in Fig. 3. Each shaft 71 and the damper 73 thereon may be further supported for their full length inside the heat treatment chamber by the provision of a continuous hinge formed between the damper 73 and a cooperating plate 75 secured to the bottom of the baffle 61.

The manner in which the air is circulated in the chamber 3 is as follows. The air within the heat treatment chamber is forced downwardly through the central passage by the fan blades 41 and passes about a charge 77 suspended from a frame 79 supported on the rails 31. The fan blades 41 are preferably of the type which creates laminar flow so that the air flow through the central passage is downward in substantially straight lines. At the bottom of the central passage the air is diverted sideways subsequently to pass upwardly either through the passages 65 or the passages 67, depending on the position of the dampers 73, and then through the skeleton frame back to the intake side of the blades. If the dampers 73 are in the horizontal position the circulating air will flow, as indicated by the dashed arrows of Fig. 3, through the passages 67 and will contact the water-cooled side walls 13 and 15 to be cooled thereby, whereas, if the flap valves are in the vertical position the air will flow, as indicated by the dot-dashed arrows of Fig. 3, through the passages 65 insulated from the cooling side walls 13 and 15, and therefore, will be shunted around the passages 67 and will not be cooled to any appreciable degree.

In accordance with a preferred form of my invention, the dampers 73 are controlled by a pneumatic means 80. Air under pressure is supplied to a pipe 81 leading to a valve-device 83 of any conventional structure by which the air under pressure is directed to a cylinder 85 by one or the other of pipes 87 and 89 to control the operation of the cylinder 85. The valve-device 83 is operated by an electromagnet 91 which controls the air-supply to cylinder 85 so that an operating rod 93 is forced downwardly when the electromagnet 91 is energized and is forced upwardly when the electromagnet is deenergized, these positions being shown in Figs. 3 and 1, respectively.

A linkage 95 is secured at one end to the operating rod 93 and at the other end to the protruded stubs of shafts 71, and is employed to convey the movement of the operating rod to the dampers 73 in such a manner that when the operating rod is in its upper position the dampers 73 are disposed horizontally, and when the operating rod is in its lower position the dampers are disposed vertically.

The pneumatic system and linkage are shown somewhat diagrammatically and are only briefly described since appropriate designs and elements for the purpose are well known and obvious. Their details form no part of my invention and manifestly any suitable mechanism or mechanisms can be employed for controlling the dampers 73, as, for instance, solenoids which have spring-actuated cores attached to the shaft 71 to rotate the latter when the solenoids are properly energized and deenergized.

I prefer to control the operation of the pneumatic means 80 and the energization of the heating means 33 automatically in accordance with the temperature in the heat treatment chamber 3, and to this end I provide an electric control system of which a pyrometer schematically indicated at 97 forms a part. This pyrometer comprises a thermocouple 99 extending into the heat treatment chamber in proximity to the intake end of the fan-blades whereby it will be exposed to the circulating air irrespective of which passage 65 or 67 the air flows through. The pyrometer also includes a temperature-responsive circuit making and breaking means 100 which is adjusted to close an electromagnetically operated mercury switch 101 when the temperature as measured by the thermo-couple is below the value that is to be maintained in the chamber 3, and to open it above that temperature.

Assuming that the temperature within the furnace is above the desired value, as might occur when the heated charge is first inserted therein, the pyrometer will move its mercury switch 101 to an open position. In this event the parts of the controlling systems and the dampers 73 have the position shown in Fig. 1, and the air will be circulated by the fan-blades 41 along a path forcing the air in contact with the water cooled jackets 13 and 15, thereby lowering the temperature in the chamber 3.

Let it be further assumed now that the temperature within the heat treatment chamber has been brought somewhat below the desired value. In this case the pyrometer 97 will now move its mercury switch 101 to circuit-closing position, and a circuit will be completed from one side of the source of power 102 through a start-stop switch 103 in start position, through the now closed mercury switch 101, through a door operated switch 104, to a junction point 105, from whence one branch of the circuit continues through a coil 107 of a control relay 109 to the other side of the source of power 102 by way of a current limiting resistance 111. Energization of the relay 109 closes a second branch circuit from the junction point 105 through contacts 113 of the relay 109, through the coil 115 of a power relay 117 to the other side of the source of power 102.

Energization of the relay 117 completes, through its contacts 119, a circuit from a source of power 121 to the electromagnet 91 which, as aforesaid, results in moving the operating rod 93 downwardly, whereby the dampers 73 are positioned vertically to shunt the air away from the cooling jackets 13 and 15 by closing the passages 67 and opening the passages 65.

Inasmuch as the passages 65 are, in effect, heat insulated and the pyrometer has indicated that the temperature within the chamber 3 is below the desired value, it is preferable to energize the heating units 33 at the same time that the dampers 73 are positioned vertically. To this end the energization of relay 117 also completes a parallel circuit from the source of power 121 through the electric heating units 33 which now will be energized to supply heat to the circulating air within the furnace in order that the temperature may be raised.

When the temperature has been raised somewhat above the desired value, the pyrometer will operate to open its mercury switch 101, thereby deenergizing the control relay 109, which, in turn, deenergizes the power relay 117. The energizing circuits to the electromagnet 91 and the heating units 33 are thus opened, whereupon the dampers 73 will be moved to their horizontal position directing the air into the cooling passages 67, and the heating units 33 will be deenergized.

It is manifest then that during a period of time the charge 77 will be maintained at a substantially constant temperature as measured by the thermocouple 99. During an extended heat treating process, each flap valve or damper 73 will oscillate between its two extreme positions, the air being heated when it is below the desired temperature and cooled when it is above, and in this way a fairly uniform and constant temperature is maintained in the heat treatment chamber 3, variations from which will depend upon the sensitivity of the control apparatus.

I prefer to employ my furnace for the heat treatment of copper-oxide rectifier plates and to this end the frame 79 has a plurality of hooks 123 depending from its upper cross members and from which the individual rectifier plates comprising the charge 77 are suspended. The direction of the flow of air through the central compartment of the chamber 3 is the same, whatever the position of the dampers 73, and is parallel to the general plane of the rectifier plates so that little if any swinging or movement of the plates will occur. In this way, marring or injury of the plates which would adversely affect their rectifying properties when assembled in a rectifier unit is effectively avoided.

As a further precaution against marring or injury to the plates, it is preferable to stop the rotation of the fan during insertion to and removal of the charge from the heat treatment chamber. In the embodiment shown in Fig. 1, this can be accomplished in any suitable manner and as indicated in Fig. 1, can be obtained by providing a door operated switch 125 in the circuit to the fan motor 37, the switch being operated to open the energizing circuit to the fan motor upon the initial opening movement of the doors 24. When a charge is to be inserted into the furnace, the rotation of the fan should be stopped so that cross currents tending to displace the plates from their vertical suspended position will be minimized, and by having the switch 125, opened by the initial movement of a door 24, open the energizing circuit to the fan motor, this protective feature is made automatic.

Inasmuch as the door operating mechanism of the present embodiment opens or shuts both doors at the same time, it is apparent that it is immaterial whether the charge be inserted or removed insofar as shutting off of the motor 37 of the fan is concerned, and cross currents will be prevented during both operations.

Where the furnace is employed in a process which involves bringing down a charge to a predetermined temperature, it may be preferable to have the furnace in cooling position immediately upon insertion of any charge. The thermocouple 99 will in most cases respond quite rapidly to changes in temperature, but it may be desirable at times to provide the door operated switch 104, similar to the door operated switch 125, in the circuit to the relay 109. In such case opening movement of a door 24 will deenergize the relay 109, resulting in a sequence of operations of the electrical control system and the pneumatic control means whereby the heating member 33 is in deenergized condition and the dampers 73 are immediately forced to a horizontal position. A manually operated switch 127 may be connected in parallel with the door operated switch 104 where the pyrometer is sufficiently sensitive to changes in temperature occurring when a charge is inserted into the furnace, this switch 127, when closed, permitting the relay 109 to be completely under control of the pyrometer switch 101.

Figure 3:
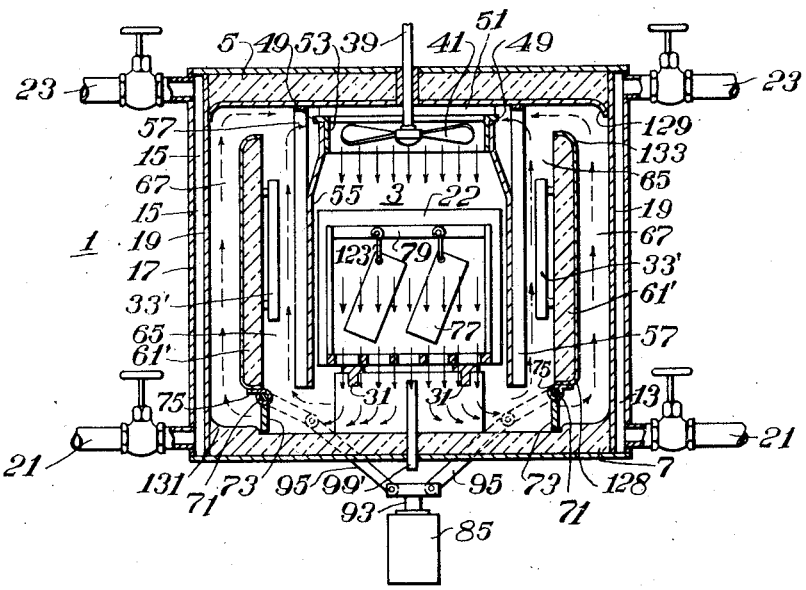
Fig. 3 is a view in transverse, vertical section of a furnace slightly modified in some details from the furnace of Fig. 1.

The furnace of Fig. 3 is somewhat modified from that of Fig. 1 in some respects.

The furnace of Fig. 3 has corners and edges, which might create objectionable eddy currents in the circulating air, rounded as shown at 128 at the bottoms of the insulating partitions or baffles 61'; at 129 between the side and top walls; at 131 between the side and bottom walls; and at 133 at the tops of the baffles 61'. The rounding of these edges is merely an added precaution that may be applied wherever sufficient eddy currents might otherwise be created to effect seriously the laminar flow through the central air passage of the heat treating chamber, and can obviously be omitted when objectionable eddy currents do not occur.

The furnace of Fig. 3 additionally differs from that of Fig. 1 in that the heating units and thermocouple are disposed somewhat more advantageously for some results. In the furnace of Fig. 3, the heating units 33' are placed in the passages 65 rather than at the bottom of the furnace as in Fig. 1, while the thermocouple 99' of the pyrometer 97 is placed in the bottom of the heat-treatment chamber, between the rails 31 and in proximity to the charge rather than near the intake side of the fan-blades 41 as in Fig. 1.

By placing the heating units in the passages 65, the furnace operates somewhat more efficiently. With the dampers 73 in cooling position and the heating units located in the bottom of the furnace as in Fig. 1, the circulating air will not only cool the charge but also the heating units, thereby requiring an extra amount of energy to reheat the units when the temperature of the chamber is to be raised. By locating the heating units in the passages 65, the air is circulated about them only when heat is to be supplied to the chamber 3 and not when the chamber is to be cooled.

The location of the thermocouple 99' in the bottom of the chamber 3 in proximity to the charge has the advantage that it will be enveloped by the circulating air directly after the latter has been in heat exchange relation with the charge, and a somewhat better temperature regulation obtains.

While I have shown my invention in the forms which I now believe to be the best embodiments thereof, it is obvious that many changes may be made and equivalents constructed. I, therefore, desire that the following claims be given their broadest interpretation and limited only by the prior art.

I claim as my invention:

1. A furnace having a heat treatment chamber for bringing a charge therein to a fixed temperature rapidly and maintaining it at that temperature while enveloped by a gas, energy-transferring means, means for circulating the gas in said chamber, said chamber having means therein for directing the circulated gas through a recirculating path having a common passage in which the charge is located, and two branch passages in said chamber, through one of the latter of which the gas passes in heat exchange relation with said energy-transferring means, and the other of which it is not in such relation, and means having a temperature responsive device for controlling the flow of gas through said branch passages.

2. A furnace having a heat treatment chamber for bringing a charge therein to a fixed temperature rapidly and maintaining it at that temperature while enveloped by a gas, a heating means and a cooling means, means for circulating the gas in said chamber, said chamber having means therein for directing the circulated gas through a path having a common passage in which the charge is located, and two branch passages in said chamber, said heating means being in one of said branches and the said other branch passage having said cooling means, and means having a temperature responsive device in said common passage for controlling the flow of gas through said branches.

3. A furnace having a heat treatment chamber in which a charge is to be brought to or maintained at a predetermined temperature, cooling means and heating means in said chamber, means for circulating a gas in said chamber including means for directing said gas along a path in said chamber in heat exchange relation with said cooling means or along a path in said chamber out of heat exchange relation therewith, and temperature responsive means for controlling said last-named means and said heating means whereby the heating is diminished when said gas is in heat exchange relation with said cooling means.

4. A furnace having walls defining a heat treatment chamber in which a charge is to be brought to or maintained at a predetermined temperature, one of said walls comprising a liquid cooled jacket, insulating baffle means within said chamber spaced from said jacket providing an insulated gas-flow passage between said jacket and baffle means, a valve means for controlling the flow of gas through said passage, temperature responsive means for controlling the position of said valve means, and means for circulating gas in said chamber, whereby the flow of gas through said passage is controlled by the position of said valve means.

5. A furnace having a heat treatment chamber in which a charge is to be brought to or maintained at a predetermined temperature, said chamber defined by walls at least one of which is a liquid cooled jacket, an insulating baffle spaced from said wall providing a gas-flow passage between said baffle and jacket with an inlet and outlet thereto, a valve means for controlling the flow of gas through said passage, means for circulating gas in said chamber whereby said gas contacts said jacket when the valve means opens said passage but does not contact said jacket to any appreciable degree when said valve closes said passage, heating means in said chamber, and temperature responsive means for operating said valve means.

6. A heat treatment chamber wherein a charge is to be brought to or maintained at a predetermined temperature, the charge comprising a plurality of closely spaced, suspended plate-like articles which should not be permitted to contact one another; walls defining said chamber, at least one of said walls comprising a liquid cooled jacket, an insulating baffle spaced inwardly from said jacket, a second baffle spaced inwardly from said first baffle, said baffles and said walls constructed and arranged to provide a main gas-flow passage and two branch passages, the inside edges of said chamber and also the edges of said baffles in the path of the gas flow being rounded for decreasing possible disturbance of the gas flow, a fan for moving gas in a single general direction through said main passage, means for supporting a charge as aforesaid in said passage with the plane of the articles in said general direction, heating means and cooling means for the gas in said chamber, only one being disposed in one of said branch passages, and valve means for controlling the flow of gas through said last passage.

7. A furnace comprising walls defining a heat treatment chamber, two opposite walls being water jackets, baffles in said chamber spaced from each of said jacket walls to provide therewith open gas-flow passages, baffles spaced from each of said first baffles to provide therewith additional open gas-flow passages and a main passage in said chamber between the last said baffles, a valve means to control the flow of gas through said open passages, a heating means in said chamber, and a fan means for circulating gas through said passages.

8. The structure of claim 7 including temperature responsive means for controlling said valve means.

9. The structure of claim 7 including temperature responsive means for controlling said valve means and said heating means.

10. The structure of claim 7 in which said heating means is electrical and disposed in said additional open passages.

11. A heat treating furnace comprising walls defining a heat-treatment chamber having a charge-treating space, said walls including vertical and horizontal walls, means for recirculating a gas within said chamber and through said space, a baffle in said chamber spaced from said vertical wall providing a branch gas passage between said vertical wall and baffle with an inlet and outlet formed by the edges of said baffle being spaced from said horizontal walls, a second baffle spaced from said first baffle providing a second branch gas passage between said baffles with an inlet and outlet formed by the edges of said second baffle being spaced from said horizontal walls, said charge-treating space being on the side of said second baffle that is away from said first baffle, valve means for controlling the flow of gas through said branch passages, and energy-transferring means for one of said branch passages.

12. A heat treating furnace comprising walls defining a heat-treatment chamber having a charge-treating space, said walls including vertical and horizontal walls, means for recirculating a gas within said chamber and through said space, a baffle in said chamber spaced from said vertical wall providing a branch gas passage between said vertical wall and baffle with an inlet and outlet formed by the edges of said baffle being spaced from said horizontal walls, a second baffle spaced from said first baffle providing a second branch gas passage between said baffles with an inlet and outlet formed by the edges of said second baffle being spaced from said horizontal walls, said charge-treating space being on the side of said second baffle that is away from said first baffle, a flap-valve means along the bottom edge of said first baffle and movable between positions closing said second branch passage or said first branch passage, and energy-transferring means for one of said branch passages.

13. A heat treating furnace comprising walls defining a heat-treatment chamber having a charge-treating space, said walls including vertical and horizontal walls, means for recirculating a gas within said chamber and through said space, a baffle in said chamber spaced from said vertical wall providing a branch gas passage between said vertical wall and baffle with an inlet and outlet formed by the edges of said baffle being spaced from said horizontal walls, a second baffle spaced from said first baffle providing a second branch gas passage between said baffles with an inlet and outlet formed by the edges of said second baffle being spaced from said horizontal walls, said charge-treating space being on the side of said second baffle that is away from said first baffle, valve means for controlling the flow of gas through said branch passages, said vertical wall comprising a liquid-cooled jacket.

14. A heat treating furnace comprising walls defining a heat-treatment chamber having a charge-treating space, said walls including vertical and horizontal walls, means for recirculating a gas within said chamber and through said space, a baffle in said chamber spaced from said vertical wall providing a branch gas passage between said vertical wall and baffle with an inlet and outlet formed by the edges of said baffle being spaced from said horizontal walls, a second baffle spaced from said first baffle providing a second branch gas passage between said baffles with an inlet and outlet formed by the edges of said second baffle being spaced from said horizontal walls, said charge-treating space being on the side of said second baffle that is away from said first baffle, valve means for controlling the flow of gas through said branch passages, said vertical wall comprising a liquid-cooled jacket, said first branch passage and charge-treating space forming one path for circulating gas, and said second branch passage and charge-treating space forming a second path, and heating elements in said second path.

15. A heat-treating furnace comprising walls defining a heat-treating chamber, means for recirculating a gas within said chamber, said walls including vertical and horizontal walls, a pair of spaced baffles within said chamber, said baffles being spaced from said walls and providing, in conjunction with said walls, a charge space and two branch passages, said branch passages communicating with said charge space to provide two paths for gas-recirculation, one path comprising said charge space and one of said branch passages and the other path comprising said charge space and the other of said branch passages, energy-transferring means for one or more of said branch passages for changing the temperature of the gas flowing therein, and means for controlling the gas-flow through said paths.

WILLARD ROTH.